United States Patent [19]
Drake et al.

[11] Patent Number: 5,291,022
[45] Date of Patent: Mar. 1, 1994

[54] HIGH EFFICIENCY INFRARED SOURCE

[75] Inventors: David M. Drake, Cottage Grove; Charles D. Woodward, Stoughton; John M. Coffin, Blue Mounds, all of Wis.

[73] Assignee: Nicolet Instrument Corporation, Madison, Wis.

[21] Appl. No.: 907,127

[22] Filed: Jul. 1, 1992

[51] Int. Cl.[5] ............................................. H01K 1/02
[52] U.S. Cl. ............................ 250/504 R; 250/493.1; 219/553
[58] Field of Search ............. 250/504 R, 493.1, 503.1; 219/553

[56] References Cited
U.S. PATENT DOCUMENTS

| | | |
|---|---|---|
| 3,225,224 | 12/1965 | Regelson . |
| 4,467,213 | 8/1984 | Farren ............................ 250/504 R |
| 4,912,329 | 3/1990 | Weiner ............................ 250/493.1 |
| 4,935,633 | 6/1990 | Curbelo et al. ................. 250/504 R |
| 5,220,173 | 6/1993 | Kanstad ........................... 250/493.1 |

OTHER PUBLICATIONS

Drawings showing an infrared source produced and sold in the U.S. before the filing of the application by Nicolet Instrument Corp. on a product sold under the trademark "PRO-STAR".

Drawings showing an infrared source manufactured and sold in the U.S. prior to the filing of the present application by Nicolet Instrument Corp. on a product sold under the trademark "PRO-IR".

Drawings labeled "Explosion Proof Source" showing an infrared source manufactured and sold in the U.S. prior to the filing of the present application by the Foxboro Company.

Primary Examiner—Jack I. Berman
Assistant Examiner—Jim Beyer
Attorney, Agent, or Firm—Foley & Lardner

[57] ABSTRACT

An infrared source for use in an infrared spectrometer includes an insulator core having a containment cavity, an outlet port in communication with the containment cavity, and an electrically heated infrared element mounted in the containment cavity with a portion thereof facing the outlet port and with the walls of the containment cavity closely spaced to the infrared element. The insulator core is formed of a ceramic fiber material which has excellent resistance to heat and very low thermal conductivity so that very little heat from the infrared element escapes from the insulator core except as infrared radiation through the outlet port. The insulator core is preferably mounted within a central cavity of a metal housing, and may be sealed off from the ambient atmosphere by an infrared transmissive window sealed to an outlet opening in the housing. The electrical supply lines from the infrared element may extend through an opening in the housing which is closed and sealed to inhibit the passage of gases from the ambient atmosphere into the interior of the housing. Where the infrared element is sealed off from the ambient atmosphere in this manner, potentially corrosive gases will be inhibited from reaching the hot infrared element. This containment of the infrared element within the insulator core allows the element to be maintained at a desired temperature for radiating infrared for use in analytical instruments such as infrared spectrometers, while consuming very low amounts of electrical power.

28 Claims, 6 Drawing Sheets

HIGH EFFICIENCY INFRARED SOURCE

FIELD OF THE INVENTION

This invention pertains generally to the field of light sources, particularly those emitting in the infrared wavelengths, and more particularly to infrared sources used in analytical instruments such as infrared spectrometers.

BACKGROUND OF THE INVENTION

Infrared spectrometers, such as Fourier transform infrared (FTIR) spectrometers, dispersive-type infrared spectrometers and filter-based infrared spectrometers, are widely used for measuring the chemical composition and characteristics of materials. In an infrared spectrometer, infrared radiation provided by a source having a relatively broad emission bandwidth is passed through a spectrometer, and then through a sample, before reaching a suitable detector. The information obtained from the detected radiation is analyzed to determine information concerning the sample, for example to determine an absorbance spectrum of the sample in the infrared range. This spectrum may then be used to identify the chemical composition of the sample.

It is desirable that the infrared source for an infrared spectrometer have a relatively broad and uniform emission spectrum over the wavelengths of interest. Unfortunately, conventional broadband infrared sources that meet these criteria typically possess several undesirable characteristics, including relatively high power consumption and the production of relatively high levels of stray infrared radiation, e.g., radiation that travels in unwanted directions. These characteristics are undesirable because they produce a substantial amount of wasted energy and an unwanted heating of the parts of the spectrometer.

Unwanted heating of spectrometer components as a result of radiation from the source propagating in unwanted directions has particularly been a problem with conventional infrared sources. An efficient infrared source will, by definition, produce large amounts of infrared radiation. The electrical filaments which are heated by electrical current to provide the infrared typically radiate in all directions, so that much of the infrared radiated from the filament does not go into the useful beam that is directed into the spectrometer, even if a reflector is used adjacent to the source to help form the beam. Consequently, a significant amount of infrared wavelength energy is not accounted for by the beam and will be absorbed by adjacent structure within the spectrometer, heating up the spectrometer. Moreover, any stray infrared from the source may interfere with the signal reaching the infrared detector, and therefore the detector must be carefully shielded from the source. Even if a conventional infrared source is surrounded by heat insulation, the insulation itself tends to increase in temperature and will eventually itself become a source of heat which is transmitted either by conduction, convection or reemission of infrared radiation to other parts of the spectrometer. Thus, conventional infrared sources have been both a heat load on the spectrometer and also a significant power drain which adds to the total power requirements of the spectrometer.

An example of an infrared source commonly used in spectrometry is the "glow bar," which is a coil of silicon carbide that is resistively heated to a temperature of about 1200 degrees Celsius. Due to the relatively large size of the coil, this type of source is relatively costly and inefficient. For instance, the glow bar consumes about 150 watts of power, which requires a relatively large power supply, and usually one that is separate from the power supply for the electronic components in the spectrometer. The combination of glow bar and power supply adds cost, weight and size to the spectrometer. The glow bar also radiates a lot of heat—more heat than can be passively dissipated inside a modern spectrometer. To remove the excess heat, the glow bar is typically cooled with water flowing through a water jacket that surrounds the source. Water cooling adds plumbing and water supply requirements, which adds further cost, weight, size and complexity to the spectrometer. Manufacturing and field service are also more difficult, since the water jacket can interfere with access to the source.

Infrared spectrometers for special purposes may sometimes be used in environments where the spectrometer may be exposed to corrosive gases. In such environments, the hot source element (commonly operating at about 1200° Celsius) cannot be exposed to these gases. Similarly, it would not be acceptable for any structures near to the source to be allowed to reach temperatures sufficiently hot to accelerate the corrosive effects of the gases.

Infrared spectrometers often use a purge gas such as dry air or nitrogen to pressurize the spectrometer to reduce corrosion caused by ambient gases that might react with the source electrode. Many manufacturing plants use gases, for example Freon-113, that will react with the hot source electrode or hot exposed parts to produce very corrosive chemicals. For example, only a few parts per billion of Freon-113, when exposed to a 1200° C. source, can produce a small but significant quantity of various acids, including hydrochloric acid and hydrofluoric acid. These acids corrode the source electrode and can also condense on the cooler components in the interferometer, for example, the fasteners, flex pivots, and electrical connectors. Purge gas failures can thus result in damage to the spectrometer.

SUMMARY OF THE INVENTION

The infrared source in accordance with the present invention is highly efficient in energy consumption, provides an exit beam of infrared radiation which can be readily collected and focused into a well defined beam, produces relatively little infrared radiation in directions other than that of the intended exit beam, and may be sealed to minimize contact between corrosive ambient gases and the infrared element of the source. The source is relatively compact and lightweight, since no reflecting elements are needed to capture the infrared emitted from the infrared element. The source is highly efficient in converting electrical energy to infrared energy, which is primarily emitted only into the exit beam which can be fully collected and focused, and provides an output infrared beam having a beam power equivalent to a conventional source while consuming far less electrical power.

The infrared source of the invention has an insulator core having an outlet port formed preferably as a fairly narrow channel which opens from the core to define the outlet (and, if desired, the optical aperture) for the infrared beam. An electrical resistive heating infrared element is supported within a containment cavity in the insulator core to face the outlet port so that infrared from the element passing through the outlet port will define the exit beam from the source. The infrared element is otherwise surrounded by the insulator core material. If desired, an aperture insert member which defines the optical aperture may be mounted between the window and the infrared element. The insert may be formed of metal machined to provide a well defined aperture.

The insulator core is formed so as to yield high thermal efficiency for the source. Preferably, the insulator core is formed of ceramic fiber material (e.g., zirconia fiber board) which has extremely good resistance to high temperatures as well as very low thermal conductivity. Such material can be formed so that the walls of the containment cavity are very close to the infrared element, and thus exposed to extreme heat, without damage to the insulator. Moreover, because of the very low thermal conductivity of the insulator core, heat from the infrared element will not be substantially transmitted through the core to any surrounding material, but rather will be primarily concentrated in the volume of the insulator core adjacent the containment cavity and also in the air within the containment cavity surrounding the element. The only significant outlet for the heat is through the outlet port. Because the volume of air within the containment cavity adjacent to the infrared element is relatively small, and very little heat is lost by conduction through the insulator core, the heating element can be maintained at a temperature appropriate for radiating the desired infrared wavelengths with low consumption of electrical power. In this manner, very high efficiency of conversion of electrical input power to infrared output power in the exit beam is obtained. The conversion is so efficient that the standard low voltage power supply of the spectrometer may generally be used to supply the source, thus avoiding the need for a separate infrared source power supply of the type which is typically required for conventional sources.

To protect the source against corrosive gases, the infrared element and core may be mounted within a housing having an infrared window which is sealed to the housing to inhibit the flow of corrosive gases into the interior of the housing. The housing is preferably formed of a solid body of metal, such as aluminum, which has good thermal conductivity. The solid housing body also preferably provides good thermal mass to allow rapid conduction of heat away from any hot spots through the mass of the body to the external surfaces of the housing where the heat can be either radiated or lost by conduction to the ambient air. The housing temperature is thereby maintained at a relatively low temperature, which may reduce the likelihood of injury to persons or property in the event of accidental contact with the housing. The insulator core is preferably mounted in a central cavity within the housing body to be surrounded by the metal of the housing except where an outlet opening is provided in the housing which is covered by the window.

In one embodiment of the invention, the infrared element is part of an infrared element support unit which includes a cap, a plug which extends into the housing and into the insulator core, and the infrared element which mounts on the end of the plug. The plug fits into an opening in the housing such that the walls of the plug and the cap are closely spaced to the walls of the housing. A sealing ring positioned between the plug and cap and the housing when the unit is assembled seals the interior of the housing from the ambient. A window assembly is fitted to the outlet opening in the housing body and is tightly engaged to the housing body with a sealing ring to prevent passage of gases into the housing. The window assembly itself includes a frame unit which threads into the housing, an infrared transmissive window which is sealed against a seal ring on the inside of the frame unit, and a holding plug which holds the window tightly in place to provide a tight seal between the window and the window frame. The window itself is formed of an infrared transmissive material such as potassium bromide, quartz, and other materials which are relatively transmissive to infrared. The window is preferably of a thickness so that it is relatively strong and impervious to migration of gases from the ambient to the interior of the housing. Because of the seals that are provided between the housing body and the infrared element unit, between the housing and the window assembly, and between the frame of the window assembly and the window, it is difficult or impossible for corrosive gases to enter the interior of the housing and make contact with the heating element.

Further objects, features and advantages of the invention will be apparent from the following detailed description when taken in conjunction with the accompanying drawings.

DETAILED DESCRIPTION OF THE INVENTION

Figure 1:
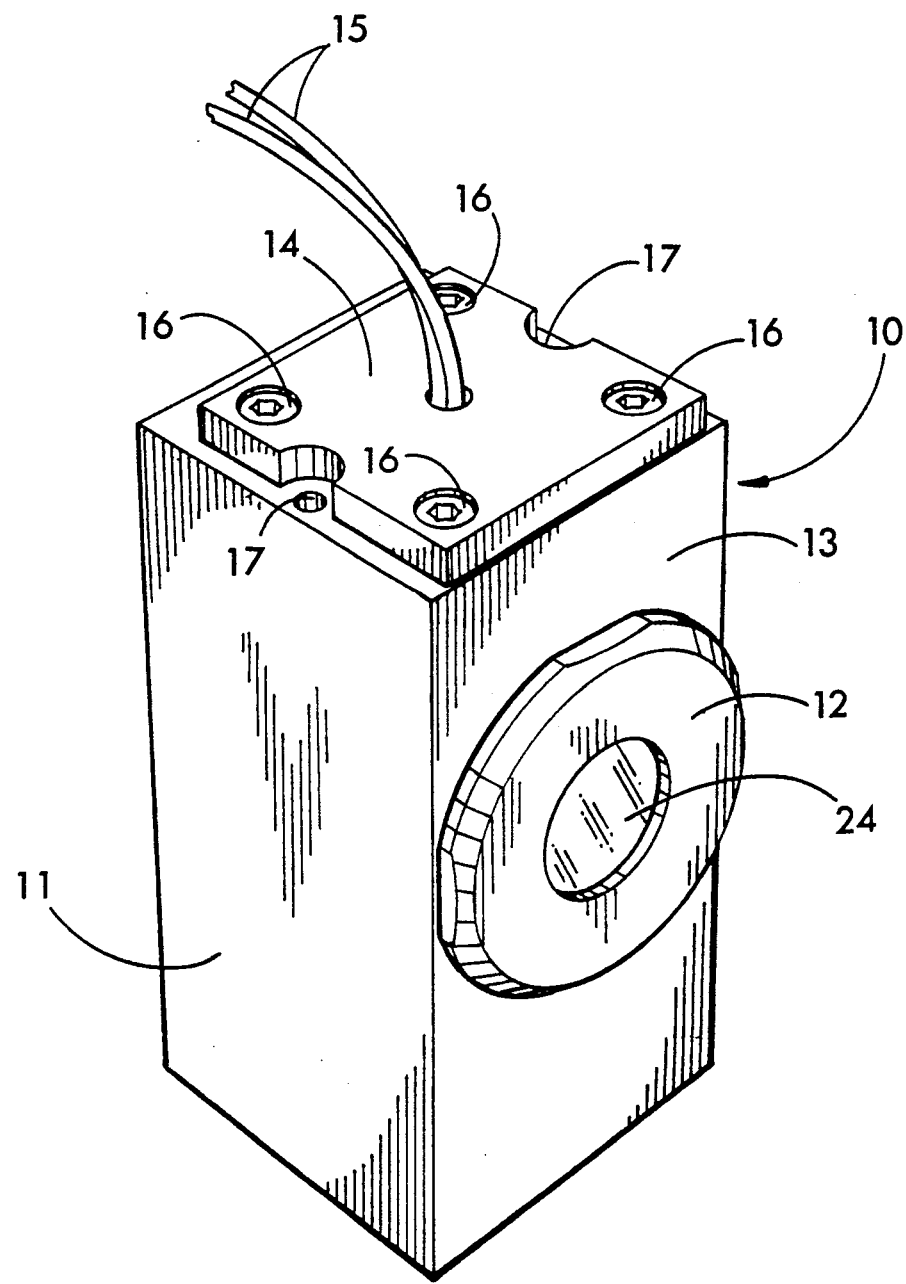
FIG. 1 is a perspective view of an infrared source in accordance with the present invention.

With reference to the drawings, an external view of an infrared source in accordance with the present invention is shown generally at 10 in FIG. 1. The source 10 includes a housing body 11 formed of metal (e.g., aluminum), having a front face 13 and a window assembly 12 extending from the front face. A top closure plate 14 is secured to the top of the housing body 11 by screws 16 and has a central opening through which electrical supply lines 15 pass which are connected to the infrared element within the source 11, as described further below. For illustrative purposes, openings 17 are shown formed in the housing 11 at positions adjacent the edges of the plate 14 and extend entirely through the body of the housing 11 from top to bottom. These holes may be utilized to mount the infrared source in a desired position within a spectrometer (not shown) using mounting bolts (not shown).

Figure 2:
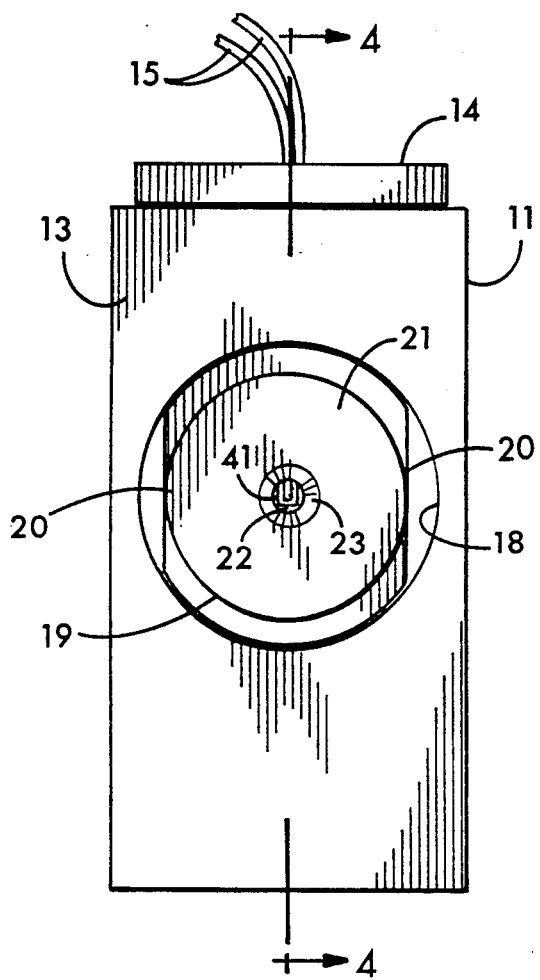
FIG. 2 is a front view of the source of FIG. 1 with the window assembly removed.

As illustrated in FIG. 2, which is a view of the source with the window assembly 12 removed, the housing body 11 has an outlet opening 18 formed in its front, extending inwardly from its front face 13, which is threaded to engage threads formed on the window assembly, as described further below. An insulator core 19 is mounted within a central cavity defined by walls 20 within the housing body 11. The insulator core 19 includes a raised circular face 21 at its outer surface, a centrally formed outlet port 22, and a conical bevel 23 formed between the port 22 and the face 21.

Figure 3:
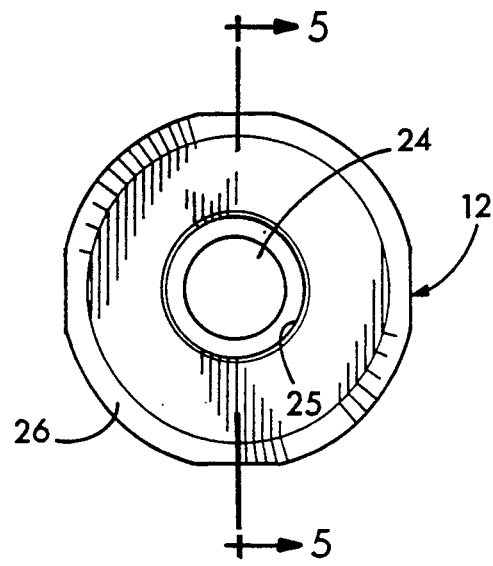
FIG. 3 is a front view of the window assembly removed from the remainder of the infrared source of FIG. 1.
Figure 5:
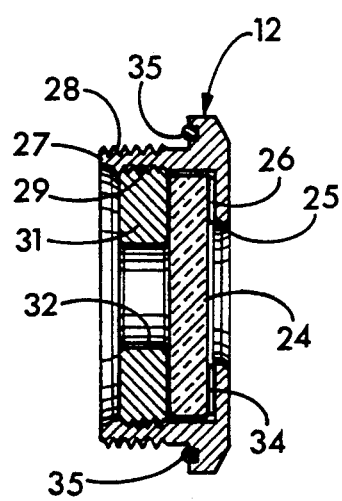
FIG. 5 is a cross-sectional view through the window assembly of FIG. 3 taken generally along the lines 5—5 of FIG. 3.

The window assembly 12 is shown in more detail in a front view in FIG. 3 and in a cross-sectional view in FIG. 5. The assembly 12 includes a window 24 which is exposed by an opening 25 in a window frame 26. The frame 26 has a rearward ring extension 27 on which is formed outer threads 28 and inner threads 29. The outer threads 28 engage with the threads formed on the bore 18 of the housing body. The window 24, which may be formed of various infrared transmissive materials such as potassium bromide (KBr) which may have a coating (e.g., barium fluoride coating), quartz, and the like, is securely held in place against the frame by a holding plug 31 having an interior bore 32. The plug 31 has outer threads that engage against the internal threads 29 to allow the plug to be screwed into place against the window 24 and to press the window against a seal ring 34 located between the interior surface of the window frame 26 and the window 24. When the holding plug 31 is screwed down tightly against the window, the ring or gasket 34 is compressed to provide a seal to prevent gases from passing between the window and the window frame. An O-ring seal 35 mounts around the ring extension 27 within a channel formed in a back surface of the window frame 26 and is compressed down tightly against the front face 13 of the housing body when the window assembly 12 is screwed into the threads formed in the outlet opening 18 in the housing 11.

Figure 4:
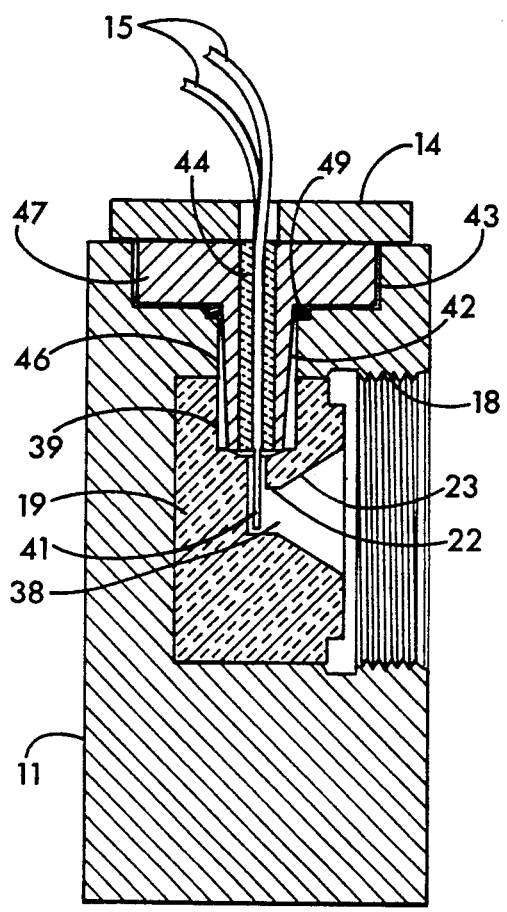
FIG. 4 is a cross-sectional view through the portion of the infrared source shown in FIG. 2 taken generally along the lines 4—4 of FIG. 2.

A cross-section through the housing 11 with the window assembly removed is shown in FIG. 4. As illustrated therein, the insulator core 19 has a containment cavity 38 which is in communication with the outlet port 22, and a somewhat larger cavity 39 near the top of the insulator core. An infrared element support unit 40 is mounted to the housing so that an electrical infrared heating element 41 of the unit 40 extends down into the containment cavity 38 so that a portion of the element 41 is exposed to the outlet port 22. The walls of the containment cavity 38 are sized so that they are closely spaced from the infrared element 41 to provide a minimum volume of air that is heated by the element within the containment cavity. The element 41 is supported at the end of a plug 42 which extends down to the bottom of the expanded cavity 39 and is adjacent to or in contact with the bottom of the cavity 39. The plug 42 also extends partially through an opening 46 provided in the housing 11 having walls which are closely spaced to the outer walls of the plug 42. The plug 42 extends up to and is preferably integrally formed with an expanded cap portion 43 which fits within an expanded opening 47 at the very top of the housing body 11. A central bore through the cap 43 and the plug 42 of the unit 40 admits the electrical wires 15 which are connected to the element 41. This bore is preferably filled and sealed with a high temperature resistant ceramic cement material 44 (e.g., Sauereisen Electrotemp #8 cement) and may be topped off with a gas barrier such as epoxy (e.g., Stycast 2662 epoxy encapsulant or, preferably, Oxy-Cast 6057LDLS epoxy casting resin from Resin Technology Group, Inc.). An O-ring gasket 49 fits within a chamfer formed around the opening 46 and is pressed down by the bottom of the cap 43 when the top plate 14 is screwed down tightly onto the top of the housing 11 and pressed down onto the cap 43. In this manner, a tight seal is formed by the gasket 49 to prevent gases from entering into the containment cavity 38. The O-ring gasket 49 (and other gaskets used in the source) is preferably formed of chemical resistant elastomer. Suitable gaskets are Chemraz TM elastomeric PTFE O-rings from Greene, Tweed.

Figure 6:
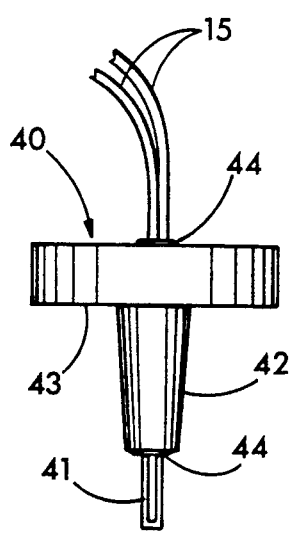
FIG. 6 is a front elevation view of the infrared element support unit portion of the infrared source of FIG. 1.
Figure 7:
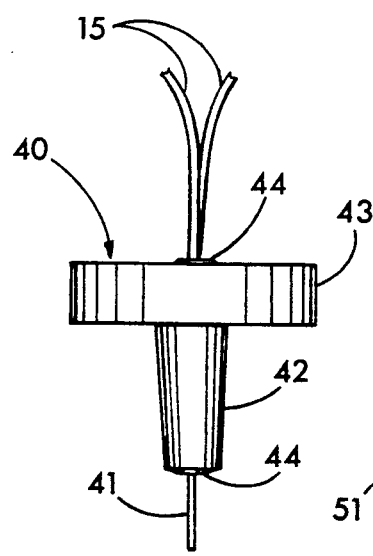
FIG. 7 is a side elevation view of the infrared element support unit.

An exemplary structure for the infrared element support unit 40 is shown in elevation in FIGS. 6 and 7. As shown therein, the element 41 may be a flattened electrical resistance heating element formed in a generally U-shape. When the portion of the heater element shown in FIG. 7 faces the outlet port 22, the heater element 41 provides a very narrow source of infrared radiation, whereas when oriented as shown in FIG. 6 to the port 22, a broader but still concentrated source of infrared radiation is presented. The particular construction and materials of the heater element 41 are not crucial, and standard electrical resistance heater elements may be utilized which emit in the appropriate wavelengths, such as those commercially used for ignition plugs for furnaces and the like. Examples are ignitors produced by Norton Industrial Ceramics which are made of silicon carbide, including model No. 301-T for 10 volt operation and Model No. 401-T for 15 volt operation.

Figure 8:
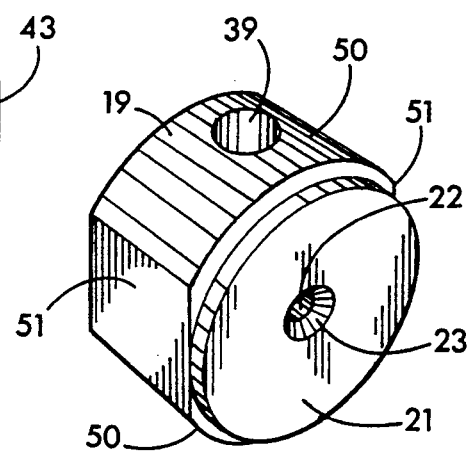
FIG. 8 is a perspective view of the insulator core portion of the infrared source of FIG. 1.

The insulator core 19 is shown in more detail in FIG. 8 removed from the interior of the housing. In the preferred structure for the insulator core, the core has substantially cylindrical top and bottom surfaces 50 and flat side surfaces 51. A correspondingly shaped central cavity within the main housing 11 is also formed having the general shape of the top and bottom surfaces 50 and the side surfaces 51 so that the insulator core 19 can be pressed tightly and firmly into position within the main housing through the front outlet 18. The side walls 20 of the central cavity within the housing engage the side walls 51 to hold the core firmly in place.

In the present invention, the core 19 is preferably formed of a ceramic fiber type material, e.g., Zircar Products, Inc. fiber ceramic SALI and, preferably, type ZYZ3 zirconia insulating board composed of yttria stabilized zirconia fibers processed and bonded with zircon. The insulator core may receive a colloidal silica surface treatment. This material has very good insulating properties while being an excellent refractory material, and is able to withstand very high temperatures (up to 1650° C.) without deterioration. Consequently, it will conduct very little heat away from the element 41 so that the air trapped within the containment cavity 38 will be heated rapidly up to a temperature at or near the element itself, and little heat loss from the element will occur through the air. Moreover, because the ceramic material of which the insulator core is made conducts heat away very slowly, the core material at the surface of the containment cavity 38 will rapidly reach thermal equilibrium temperature with the heating element itself. These effects combine to maintain the temperature of the element 41 at the desired temperature for emission of infrared at desired wavelengths with very low power drawn from a power supply (not shown) connected to the supply wires 15. Very little power is drawn as compared to the power drawn by a heating element which is fully exposed to either convective heat transfer or radiative heat transfer in all directions from the heating element. For example, typical prior infrared sources may draw 150 watts of power, while the source of the present invention may provide an equivalent infrared exit beam while drawing 15 watts.

Figure 9:
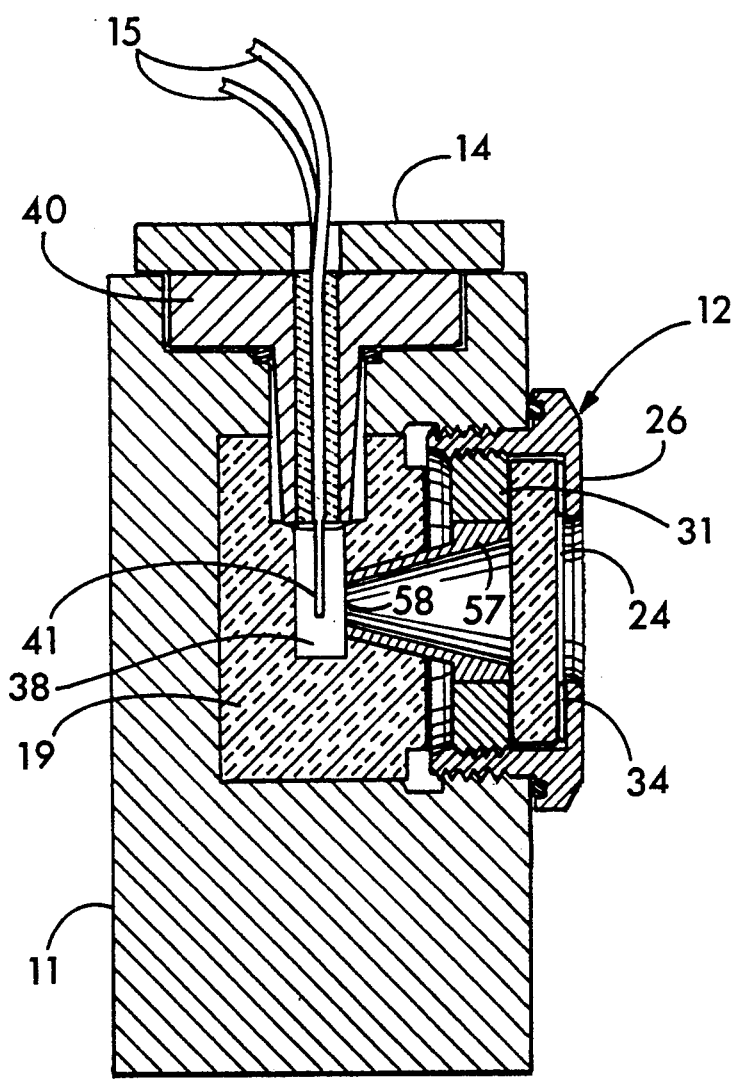
FIG. 9 is a cross-sectional view similar to that of FIG. 4 showing a modified embodiment of the source having an insert which defines the infrared beam aperture.

A cross-sectional view through a modified embodiment of the infrared source of the invention is shown in FIG. 9. In this embodiment, an aperture defining insert 57 is mounted to fit within the inner bore of the holding plug 31 and has a conical shaped inner surface which extends down to an opening 58 adjacent to the infrared element 41. The opening 58 defines, with the inner surfaces of the insert 57, the optical aperture of the source. The insert 57 can be formed of a ceramic or metal material, allowing close tolerance machining of the surfaces to provide a precisely defined aperture.

Figure 10:
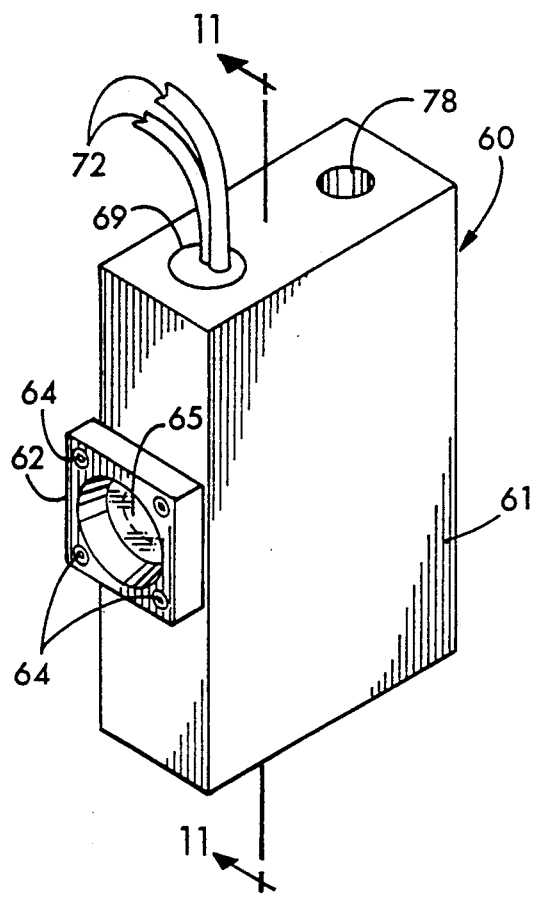
FIG. 10 is a perspective view of another embodiment of an infrared source in accordance with the present invention.
Figure 11:
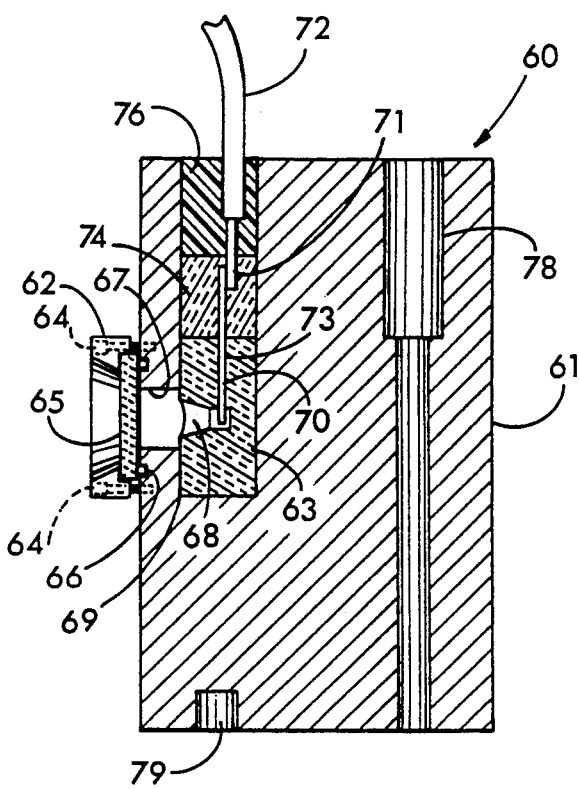
FIG. 11 is a cross-sectional view through the source of FIG. 10 taken generally along the lines 11—11 of FIG. 10.

A further embodiment of an infrared source in accordance with the invention is shown generally at 60 in FIG. 10 in partial perspective view. The source 60 has a housing body 61, formed of metal such as aluminum or other heat conductive material, and has a window assembly 62 mounted on the front face thereof. An insulator core 63, shown in cross-section in FIG. 11, is mounted within a central cavity 69 in the housing body 61. The window assembly 62 is attached to the housing body 61 by screws 64 which thread through the window assembly into threaded holes in the housing body to tightly press an infrared transmissive window 65 against a sealing ring 66 which surrounds an outlet opening 67 in the housing body adjacent to the insulator core 63. This sealing ring thus provides an air-tight seal against gases reaching the heating element 70 which is mounted within a containment cavity 73 in the insulator core 63. An outlet port 68 in the insulator core 63 exposes a portion of the infrared element 70 to the outlet opening 67 to allow infrared radiated from the element to pass through the window 65. Generally, the outlet port 68, combined with the outlet opening 67 and the conical opening in the window assembly, defines the optical aperture for the source.

The source 60 may also have a window assembly which screws into a threaded bore in the housing body, if desired, with sealing O-rings between the window assembly and the window and between the window and the housing body to seal off the interior of the housing from the atmosphere.

Figure 12:
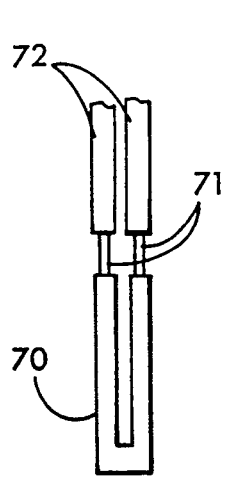
FIG. 12 is a front view of the infrared element used in the source of FIG. 10.

As shown in FIG. 12, the infrared element 70 may be formed as a U-shaped heating element such as silicon carbide, as described above, which is electrically connected to conductors 71, e.g., formed of copper, which form part of supply wires 72 which extend to a power supply (not shown). In the source of FIG. 11, the infrared element 70 extends into the containment cavity of the insulator core 73, but a portion of it also extends upwardly beyond the insulator core. To seal the insulator core in place and to surround the portion of the infrared element 70 above the insulator core, a high temperature ceramic material 74, for example, a Sauereisen No. 8 cement, may be laid around the exposed portion of the infrared element 70 and the adjacent conductors 71. This ceramic material will be able to withstand the high temperature of the heater element 70 in contact with it. Above the layer 74 and out of contact with the heater element, a layer of air impervious sealant 76 (for example, epoxy) is preferably formed to provide an airtight seal to prevent gases from entering into the containment cavity 73 of the insulator core and contacting the element 70.

To allow the source to be mounted firmly in place within a spectrometer, a bore 78 is formed entirely through the housing body 61 at a position spaced away from the insulator core, and a hole 79 is formed at the bottom of the housing body preferably directly under the infrared element 70. The source may be mounted in place in a spectrometer which has a peg which fits into the hole 79 by providing a bolt which passes through the hole 78 and threads into a threaded hole in a spectrometer mounting plate (not shown) to secure the source into a desired position within the spectrometer.

As described above, the infrared source 60 is formed so that the infared element 70 is generally permanently embedded within the housing 61. In this configuration, the source 60 is expected to be relatively easy and inexpensive to replace. In addition, the source 60 is expected to have a relatively long life since the infrared element 70 is expected to be substantially sealed from the outside atmosphere by the window assembly 62, and should deteriorate relatively slowly over time. Other measures to extend the life of the infrared element 70, for example backfilling the interior of the source with a noble gas, such as argon or xenon, and/or adding a desiccant to absorb water vapor that may outgas from the insulator core 63, may also be used.

Figure 13:
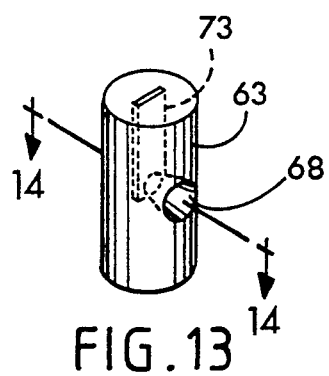
FIG. 13 is a perspective view of the insulator core of the source of FIG. 10.
Figure 14:
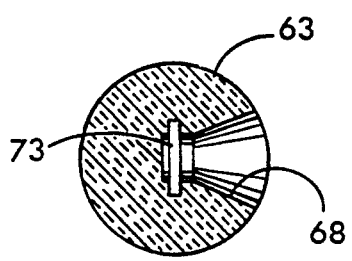
FIG. 14 is a cross-sectional view through the insulator core of FIG. 13 taken generally along the lines 14—14 of FIG. 13.

It is noted again from the views of FIGS. 11, 13 and 14 that the infrared element 70 is inserted within the containment cavity 73 in close spacing to the walls of the cavity. Preferably, substantially all of the element 70 is in contact with the insulator core material to minimize air-space about the element. The element 70 is preferably out of contact with the walls of the containment cavity only at the outlet port 68. The material of the insulator core 63 is again preferably formed as described above for the insulator core 19, preferably comprising a fiber ceramic material with high resistance to temperature and very low thermal conductivity. The sealing of the infrared element within the insulator core as described above, with the only outlet being through the outlet port 68, allows the element 70 to be heated by electrical power provided through the supply wires 72 at much lower power levels than would otherwise be required for a conventional source providing the same infrared beam power.

The infrared source 60 is thus substantially entirely sealed from the outside ambient so that potentially corrosive gases will not readily reach the heating element, and any corrosive gases formed at the heating element will not readily escape from the interior of the housing.

Figure 15:
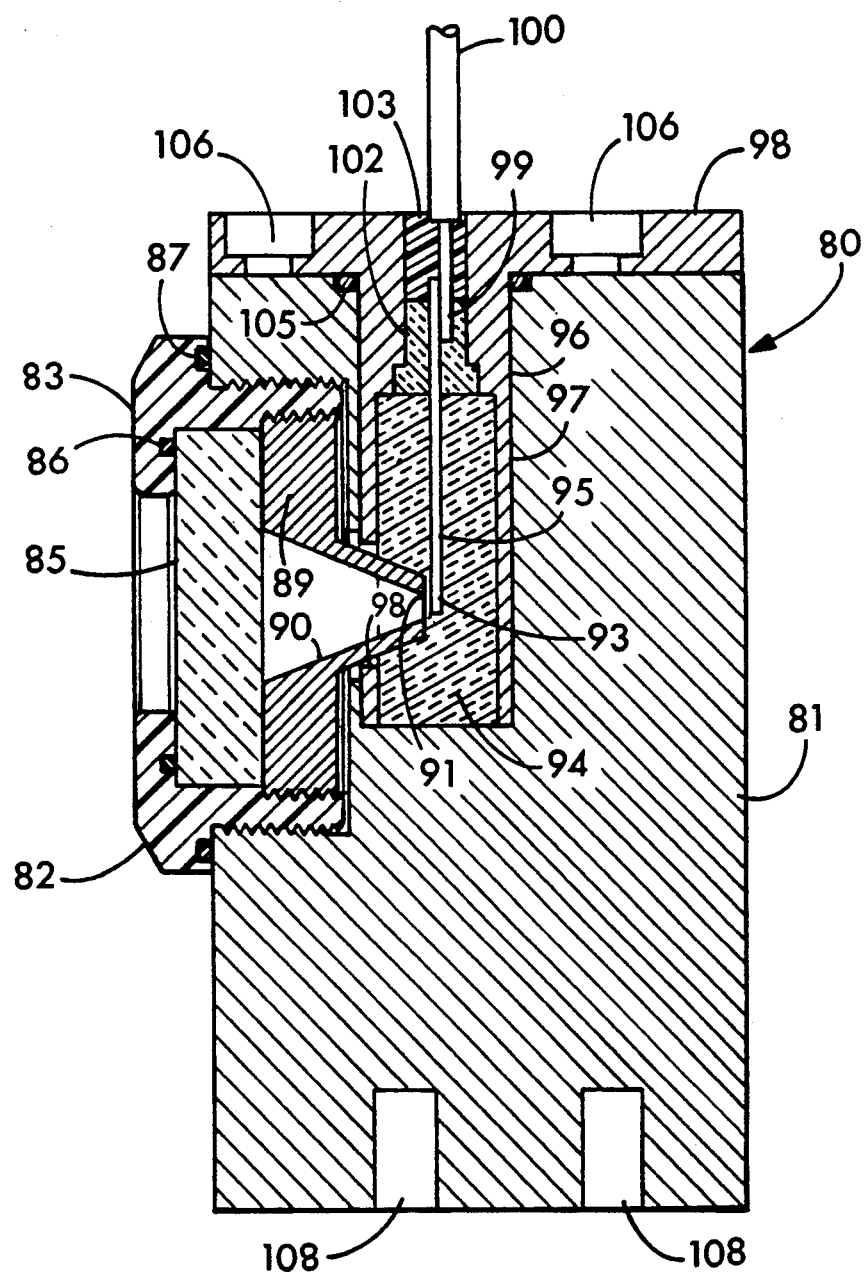
FIG. 15 is a cross-sectional view through a further modified embodiment of the source which has an insert to define the aperture and a removable element unit.

A cross-sectional view through a preferred embodiment of a source 80 in accordance with the invention is shown in FIG. 15. The source 80 includes certain of the features of the source shown in FIG. 9 and the source of FIGS. 10 and 11. The source 80 has a metal housing 81 formed of a metal such as aluminum and a window assembly 82 substantially identical to the window assembly 12. The window assembly 82 includes a frame 83, an infrared transmissive window 85, an O-ring seal 86 between the window 85 and the frame 83, an O-ring seal 87 between the frame 83 and the front face of the housing 81, and a holding plug and aperture member 89 which threads into the interior bore of the frame 83 to press the window 85 tightly against the seal 86. In the source 80, the window frame 83 may be formed of a high temperature plastic, e.g., Ertalyte ® crystalline PET thermoplastic polyester from ERTA. The member 89 has an aperture defining conical wall 90 which has an open inner end 91, defining the optical aperture of the source, which is located at a position very close to the bottom end of the infrared element 93 within an insulator core 94. The member 89 may be formed of a metal, such as stainless steel, which can be machined to form the aperture. The aperture member 89 is shown in direct contact with the window 85 in FIG. 15. However, a compliant spacer, such as an O-ring gasket, may be placed between the window 85 and the aperture member 89 to compensate for any variations in window thickness to maintain a nearly constant aperture spacing and hold the window firmly in place. It is apparent that the aperture member 89 may have various structures, and could form part of the window assembly to thread into the housing body. As illustrated in FIG. 15, the inner end 91 of the insert 90 extends into the insulator core 94 to terminate at a position closely adjacent to, but preferably out of contact with, the heating element 93. In this manner, the opening 91 combined with the inner walls of the insert 90 precisely define the optical aperture of the source. Essentially all of the element 93 is in contact with the insulator core except at the aperture opening 91 to minimize heat loss from the element.

The infrared element 93 is preferably mounted in a containment cavity 95 within the insulator core 94. The containment cavity has walls which are very closely spaced to, and preferably in contact with, the infrared element 93. The insulator core 94 is preferably formed of the fiber ceramic material as described above. This material is relatively soft and can be penetrated by a hard material such as the solid infrared element 93. One manner of forming the containment cavity 95 within the core 94 is by pressing the element 93 into a solid block forming the insulator core 94 until the infrared element 93 extends downwardly to the desired termination point within the insulator core 94 at the apex of a cone shaped hole formed in the core which receives the conical wall 90. In this manner, the infrared element forms its own containment cavity and the walls of the containment cavity are essentially in contact with the infrared element except at the aperture defining opening 91 which is also the outlet port of the insulator core, absolutely minimizing the air space around the heating element within the insulator core. The containment cavity may alternatively be preformed, such as by milling, to dimensions which closely fit to the infrared element. Preferably, the infrared heating element 93 is formed so that only the bottom end of the heating element at the position adjacent to the opening 91 attains the maximum heating temperature, and the material of the insulator core 94 is capable of withstanding the temperatures of the heating element 93 which is in contact therewith.

The insulating core 94 is formed as part of a replaceable source element unit 96. The unit 96 includes a substantially cylindrical body 97 which extends into a corresponding well within the housing 81, and a top plate 98 which may be integrally formed with the body 97. The insulating core 94 is mounted within a central cavity within the body 97, and an opening 98 is formed in the walls of the body 97 at a position facing the window assembly to allow the conical wall 90 to pass therethrough when the window assembly 82 is screwed into the housing 81. The heating element 93 is secured in the unit 96 in a manner similar to that described above for the source 60, in that a ceramic sealant material 102 is filled in a cavity above the insulating core 94 to surround and embed a portion of the heating element which extends above the core 94, as well as the portions of the wires 99 from the electrical supply lines 100 which connect to the element 93. An epoxy sealant 103 seals up the top of the opening around the wires 99 to prevent gases from the ambient to come into contact with the infrared element 93. To further seal the element 93 from the surrounding atmosphere, a sealing O-ring 105 mounted in a chamfer in the housing 81 surrounds the opening in the housing through which the body 96 passes and provides an air tight seal when the top plate 98 is secured to the housing by screws (not shown) which thread through screw openings 106 in the plate 98. Openings 108 at the bottom of the housing 81 facilitate the mounting and proper placement of the source within a spectrometer.

Because the sharply defined opening 91 of the insert 90 is formed just adjacent to the hot part of the infrared element 93 to define the aperture therefrom, a very sharply defined aperture is obtained in the source 80.

It is understood that the present invention is not limited to the particular embodiments and the construction and arrangement of parts set forth herein as illustrative, but embraces such modified forms thereof as come within the scope of the following claims.

What is claimed is:

1. An infrared source, comprising:
(a) a housing having a central cavity therein and an outlet opening extending from the exterior of the housing to the central cavity, the housing formed of a metal which is a good heat conductor;
(b) an insulator core mounted in the central cavity of the housing, the insulator core formed of a fiber ceramic material having high resistance to heat and very low thermal conductivity, the insulator core having a containment cavity therein and an outlet port communicating with the containment cavity and extending to the exterior of the insulator core, the insulator core mounted in the housing with the outlet opening in the housing opening onto the outlet port of the insulator core;
(c) an electrically heatable infrared element which provides infrared radiation at desired wavelengths when supplied with electrical power mounted within the containment cavity of the insulator core, the infrared element having electrical supply lines attached thereto extending out from the insulator core and through the housing body to the exterior of the housing; and (d) window means for covering and sealing the outlet opening in the housing while allowing infrared from the outlet port to be passed therethrough, wherein the window means includes a window assembly comprising an infrared transmissive window, a window frame having an interior surface for supporting the window, a first sealing ring between the window frame and the window, and a holding plug threaded into the interior of the window frame to press against the window and press the window against the sealing ring to provide a gas tight seal between the window and the window frame, wherein the window frame has external threads which mate with internal threads formed in the outlet opening of the housing so that the window frame can be threaded into the outlet opening to hold the window assembly tightly in place in the housing, and further including a second sealing ring mounted between the housing and the window frame to inhibit gases from entering the interior of the housing between the window frame and the housing.

2. The infrared source of claim 1 wherein the outlet port in the insulator core is formed as a circular opening to define the optical aperture of the source.

3. The infrared source of claim 1 further including an insert formed of a solid material different from that of the insulator core which is inserted in the outlet port and has internal surfaces defining the optical aperture of the source.

4. The infrared source of claim 3 wherein the insert is formed of metal and has conical interior surfaces converging to a circular opening at the containment cavity which defines the optical aperture of the source.

5. The infrared source of claim 3 wherein the insert has an opening defining the aperture which is located at a position just adjacent the infrared element.

6. The infrared source of claim 1 wherein the outlet port includes at least a portion thereof which is conical in shape and decreases in cross-section from the exterior of the insulator core.

7. The infrared source of claim 1 wherein the insulator core is formed of bonded zirconia fibers.

8. The infrared source of claim 1 wherein the infrared element is supported by an infrared element support unit which includes a cap and a plug extending from the cap portion, the plug and cap having internal bore lines with the infrared element mounted to an end of the plug and having the electrical supply therefrom extending up through the internal bore lines of the plug and the cap, the internal bore being filled with a ceramic insulating material.

9. The infrared source of claim 8 wherein the housing has a second opening extending from the exterior of the housing to the central cavity therein, and wherein the walls defining the second opening in the housing and the outer walls of the cap and plug are formed to be closely spaced from one another when the infrared element support unit is in place within the housing with the infrared element at the end of the plug supported in the containment cavity with a portion of the infrared element at a position adjacent to the outlet port, and including a third sealing ring mounted between the infrared element support unit and the housing, and means for pressing, the infrared element support unit against the third sealing ring and the housing to provide a gas tight seal between the housing and infrared element support unit to inhibit gases from entering the interior of the housing.

10. The infrared source of claim 1 wherein a second opening extends from the central cavity within the housing to an exterior wall of the housing, wherein the electrical supply lines extend through the second opening from the insulator core to the exterior of the housing, and including a ceramic insulator material packed into the second opening adjacent to the insulator core to cover the heater element, and further including a sealant material formed in the second opening to seal the second opening and the ceramic material to inhibit the passage of ambient gases into the interior of the housing.

11. An infrared source, comprising:

(a) a housing having a central cavity therein and an outlet opening extending from the exterior of the housing to the central cavity;

(b) an insulator core mounted in the central cavity of the housing, the insulator core formed of a fiber ceramic material having high resistance to heat and very low thermal conductivity, the insulator core having a containment cavity therein and an outlet port communicating with the containment cavity and extending to the exterior of the insulator core, the insulator core mounted in the housing with the outlet opening in the housing opening onto the outlet port of the insulator core;

(c) an electrically heatable infrared element which provides infrared radiation at desired wavelengths when supplied with electrical power mounted within the containment cavity of the insulator core with the walls of the containment cavity in contact with the infrared element except at the outlet port thereby minimizing air space around the element, the infrared element having electrical supply lines attached thereto extending out from the insulator core and through the housing body to the exterior of the housing; and (d) window means for covering and sealing the outlet opening in the housing while allowing infrared from the outlet port to be passed therethrough.

12. The infrared source of claim 11 wherein the outlet port in the insulator core is formed as a circular opening to define the optical aperture of the source.

13. The infrared source of claim 11 further including an insert formed of a solid material different from that of the insulator core which is inserted in the outlet port and has internal surfaces defining the optical aperture of the source.

14. The infrared source of claim 13 wherein the insert is formed of metal and has conical interior surfaces converging to a circular opening at the containment cavity which defines the optical aperture of the source.

15. The infrared source of claim 13 wherein the insert has an opening defining the aperture which is located at a position just adjacent the infrared element.

16. The infrared source of claim 11 wherein the outlet port includes at least a portion thereof which is conical in shape and decreases in cross-section from the exterior of the insulator core.

17. The infrared source of claim 11 wherein the housing is formed of a metal which is a good heat conductor and the window means includes a window assembly comprising an infrared transmissive window, a window frame having an interior surface for supporting the window, a first sealing ring between the window frame and the window, and a holding plug threaded into the interior of the window frame to press against the window and press the window against the sealing ring to provide a gas tight seal between the window and the window frame, wherein the window frame has external threads which mate with internal threads formed in the outlet opening to hold the window assembly into the outlet opening to hold the window assembly tightly in place in the housing, and further including a second sealing ring mounted between the housing and the window frame to inhibit gases from entering the interior of the housing between the window frame and the housing.

18. The infrared source of claim 11 wherein the insulator core is formed of bonded zirconia fibers.

19. The infrared source of claim 11 wherein the infrared element is supported by an infrared element support unit which includes a cap and a plug extending from the cap portion, the plug and cap having internal bore lines with the infrared element mounted to an end of the plug and having the electrical supply therefrom extending up through the internal bore lines of the plug and the cap, the internal bore being filled with a ceramic insulating material.

20. The infrared source of claim 19 wherein the housing has a second opening extending from the exterior of the housing to the central cavity therein, and wherein the walls defining the second opening in the housing and the outer walls of the cap and plug are formed to be closely spaced from one another when the infrared element support unit is in place within the housing with the infrared element at the end of the plug supported in the containment cavity with a portion of the infrared element at a position, adjacent to the outlet port, and including a third sealing ring mounted between the infrared element support unit and the housing, and means for pressing the infrared element support unit against the third sealing ring and the housing to provide a gas tight seal between the housing and infrared element support unit to inhibit gases from entering the interior of the housing.

21. The infrared source of claim 11 wherein a second opening extends from the central cavity within the housing to an exterior wall of the housing, wherein the electrical supply lines extend through the second opening from the insulator core to the exterior of the housing, and including a ceramic insulator material packed into the second opening adjacent to the insulator core to cover the heater element, and further including a sealant material formed in the second opening to seal the second opening and the ceramic material to inhibit the passage of ambient gases into the interior of the housing.

22. An infrared source, comprising:
(a) a housing having a central cavity therein and an outlet opening extending from the exterior of the housing to the central cavity;
(b) an insulator core mounted in the central cavity of the housing, the insulator core formed of a fiber ceramic material having high resistance to heat and very low thermal conductivity, the insulator core having a containment cavity therein and an outlet port communicating with the containment cavity and extending to the exterior of the insulator core, the insulator core mounted in the housing with the outlet opening in the housing opening onto the outlet port of the insulator core;
(c) an electrically heatable infrared element which provides infrared radiation at desired wavelengths when supplied with electrical power mounted within the containment cavity of the insulator core, the infrared element having electrical supply lines attached thereto extending out from the insulator core and through the housing body to the exterior of the housing;
(d) window means for covering and sealing the outlet opening in the housing while allowing infrared from the outlet port to be passed therethrough; and
(e) an insert formed of a solid material different from that of the insulator core which is inserted in the outlet port and has internal surfaces defining the optical aperture of the source.

23. The infrared source of claim 22 wherein the insert is formed of metal and has conical interior surfaces converging to a circular opening at the containment cavity which defines the optical aperture of the source.

24. The infrared source of claim 22 wherein the insert has an opening defining the aperture which is located at a position just adjacent the infrared element.

25. The infrared source of claim 22 wherein the infrared element is supported by an infrared element support unit which includes a cap and a plug extending from the cap portion, the plug and cap having internal bore lines with the infrared element mounted to an end of the plug and having the electrical supply therefrom extending up through the internal bore lines of the plug and the cap, the internal bore being filled with a ceramic insulating material.

26. The infrared source of claim 25 wherein the housing has a second opening extending from the exterior of the housing to the central cavity therein, and wherein the walls defining the second opening in the housing and the outer walls of the cap and plug are formed to be closely spaced from one another when the infrared element support unit is in place within the housing with the infrared element at the end of the plug supported in the containment cavity with a portion of the infrared element at a position adjacent to the outlet port, and including a sealing ring mounted between the infrared element support unit and the housing, and means for pressing the infrared element support unit against the sealing ring and the housing to provide a gas tight seal between the housing and infrared element support unit to inhibit gases from entering the interior of the housing.

27. The infrared source of claim 22 wherein a second opening extends from the central cavity within the housing to an exterior wall of the housing, wherein the electrical supply lines extend through the second opening from the insulator core to the exterior of the housing, and including a ceramic insulator material packed into the second opening adjacent to the insulator core to cover the heater element, and further including a sealant material/formed in the second opening to seal the second opening and the ceramic material to inhibit the passage of ambient gases into the interior of the housing.

28. The infrared source of claim 22 wherein the insulator core is formed of bonded zirconia fibers.

* * * * *